United States Patent [19]

Hattori

[11] Patent Number: 4,571,470
[45] Date of Patent: Feb. 18, 1986

[54] TURN SIGNAL SWITCHING DEVICE

[75] Inventor: Yoshio Hattori, Kawasaki, Japan

[73] Assignee: Niles Parts Co., Ltd., Tokyo, Japan

[21] Appl. No.: 482,249

[22] Filed: Apr. 5, 1983

[30] Foreign Application Priority Data

Apr. 13, 1982 [JP] Japan .............................. 57-053547[U]

[51] Int. Cl.⁴ ............................................. H01H 9/00
[52] U.S. Cl. ................................ 200/61.54; 200/61.27
[58] Field of Search ............... 200/61.27, 61.28, 61.29,
200/61.3, 61.31, 61.32, 61.33, 61.34, 61.35,
61.36, 61.37, 61.38, 61.54

[56]         References Cited

U.S. PATENT DOCUMENTS 2,361,204  10/1944  Hollins et al. ............... 200/61.27 X
4,496,810   1/1985  Suzuki et al. ................... 200/61.54

FOREIGN PATENT DOCUMENTS 57-20423  5/1982  Japan .

Primary Examiner—G. P. Tolin
Assistant Examiner—Morris Ginsburg
Attorney, Agent, or Firm—Vorys, Sater, Seymour and Pease

[57]          ABSTRACT

A turn signal for an automobile having a turn signal switch controlling the high beam and low beam of a head lamp by operating a control lever up and down and at the same time flashing right and left turn signal lamps by turning the control lever to the right and to the left, and a cancel mechanism stopping the flashing action of the turn signal lamps forcibly on completion of right turn or left turn of automobile, ensuring an organized operation by connecting the turn signal switch and the cancel mechanism placed spatially with a control lever and further, allowing the turn signal switch latitude of the mounting position thereof.

3 Claims, 6 Drawing Figures

TURN SIGNAL SWITCHING DEVICE

BACKGROUND OF THE INVENTION

The present invention relates to a turn signal switching device to actuate the turn signal lamps of an automobile, and more specifically, to a turn signal switching device for an automobile comprising a turn signal switch which actuates a directional turn signal lamp when moved in a desired direction and a self-cancel mechanism which restores the turn signal switch automatically to a neutral position in response to a return-rotating operation of a steering wheel. The switch and the self-cancel mechanism are constructed in a respectively separated form and connected by mechanically engaging them with each other when they are fitted to a steering column.

In the conventional turn signal for automobile, as shown by an embodiment of the prior art shown in FIGS. 1 and 2, for example, a self-cancel mechanism consisting of a cancel cam 1, a spring-fitted member 2, a moving member 3 and a cancel rotor 4 rotated together with a steering wheel 7 and a turn signal switch 28 actuated by the operation of a control lever 5 attached to the aforesaid moving member 3 have been mounted on a predetermined position at the upper face portion and the lower face portion of a supporting member 6 and installed integrally on the central lower face portion of the steering wheel 7. However, such traditional turn signal for automobile has incurred some shortcomings, i.e., the form and the operating method of the control lever 5 are limited by its relation with the self-cancel mechanism and, for example, it becomes an incoherent specific element even in combination with other various control switches. Moreover, the construction of the turn signal switch 28 is also restricted, making it difficult to simplify the mechanism. In order to overcome such disadvantages, e.g., as shown in FIG. 3, a turn signal for an automobile is known wherein a cancel detector 40 and a turn signal switch 38 having an automatic return mechanism have been composed separately and so arranged to return automatically a control lever 8 of the turn signal switch 38 by connecting to a flasher unit 39 with a so-called electrical means. This turn signal for an automobile has also had such drawback that the number of component parts including a semiconductor element 9, capacitor 10, resistor 11 and solenoid 12 increases and results in a cost increase.

In FIG. 3, an ignition switch 31 is fitted between a d-c power supply 32 and the turn signal switch 38. A diode 33 to absorb surge is fitted between the transistor 9 and the ignition switch 31. Resistors 34 and 35 are respectively connected in series to the base of the transistor 9. A left-side turn signal lamp 36 and a right-side turn signal lamp 37 are connected to the output side of the flasher unit 39.

The present invention has been made to atone for the abovediscussed shortcomings. Namely, the feature thereof is to provide a turn signal for an automobile wherein a sefl-cancel mechanism and a turn signal switch are separated and composed independently of each other. When attaching them to the steering column of automobile, for example, by connecting the control lever of the self-cancel mechanism and the turn signal switch mechanically with a simple engaging means by a boss and a hollow, they can be operated in conjunction with each other. The turn signal switch can be mounted in a relatively free, isolated and desired position. For example, the switch can be fitted combined with other various control switches and a greater latitude is allowed in the form and operating method of the control lever as a result of the restrictions having largely been relaxed, thus enabling to make the combination simpler and at a lower cost.

SUMMARY OF THE INVENTION

The present invention is an improvement of a turn signal for an automobile. It is an object of the present invention to provide a novel turn signal for an automobile wherein a turn signal switch connected to a circuit which flashes a left-side or a right-side turn signal lamp when a turn signal lever is operated to the right or left is isolated from a self-cancel mechanism which has a function to restore a cancel cam when the steering wheel is returned to the original position thereof upon completion of the left turn or right turn of an automobile and to stop the flashing action of the turn signal lamp, both being constructed independently of each other but joined with a control lever with each other to enable the mounting position of each component element to be selected as desired.

It is another object of the present invention to provide a simple and compact turn signal for an automobile wherein the operating method and configuration of a switch can be designed more freely.

It is a further object of the present invention to provide a turn signal for automobile which is applicable to place with relative ease by merely changing the length of the control lever and the fulcrum position and further to allow easy installment of the click joint of a lane change mechanism. The above-described other objects and novel features of the present invention will be more fully understood by reference to the following detailed description thereof, when read referring to the attached drawings. What is to be understood in particular is that the attached drawings are for the purpose of explaining the present invention, and not for limiting this invention to what is shown in the drawings.

DETAILED DESCRIPTION OF THE PREFERRED EMBODIMENT

Figure 1:
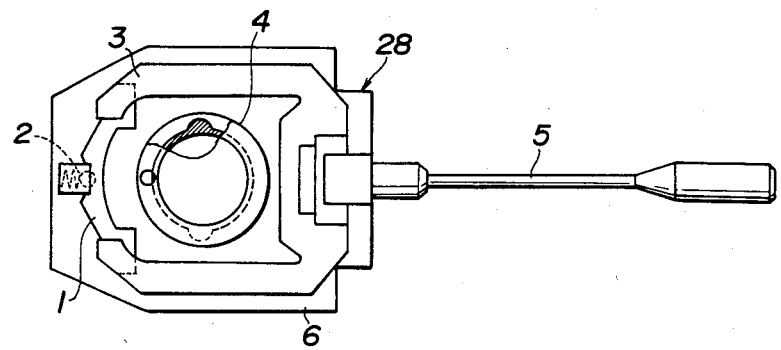
FIG. 1 is a plan view showing one embodiment of the prior art turn signal for an automobile.
Figure 2:
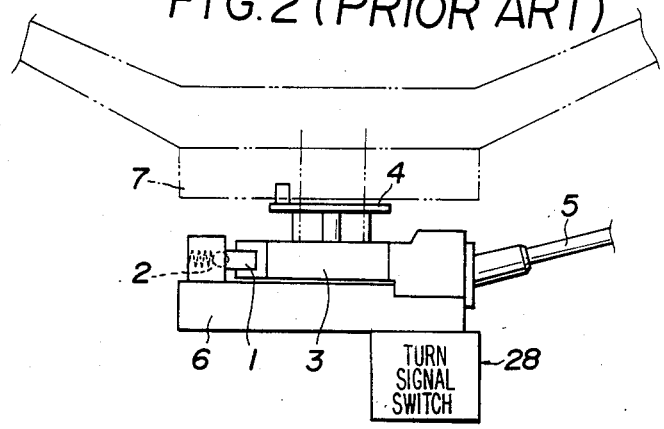
FIG. 2 is a a front elevational view partially in phantom of the embodiment in FIG. 1.
Figure 3:
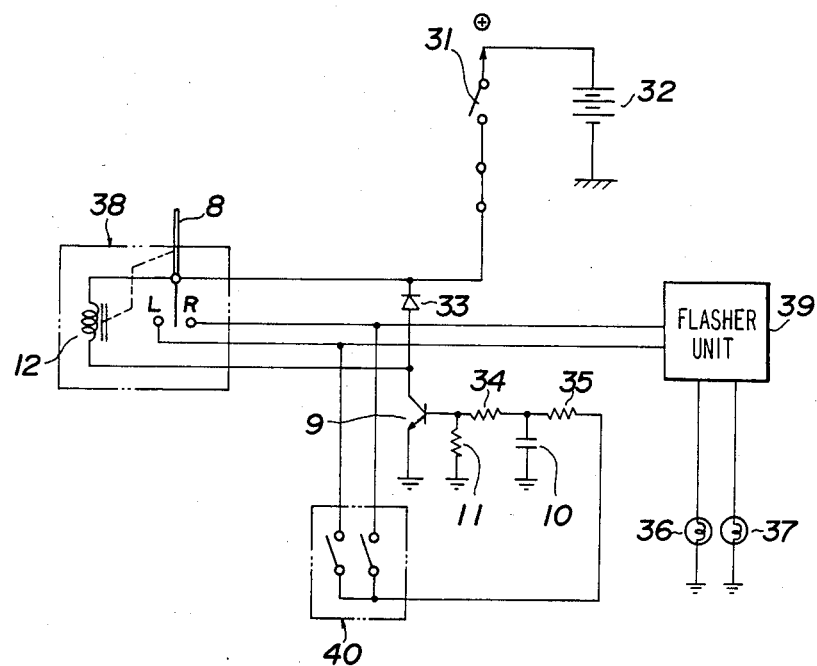
FIG. 3 is an explanatory drawing showing another embodiment of a prior art turn signal for an automobile.
Figure 4:
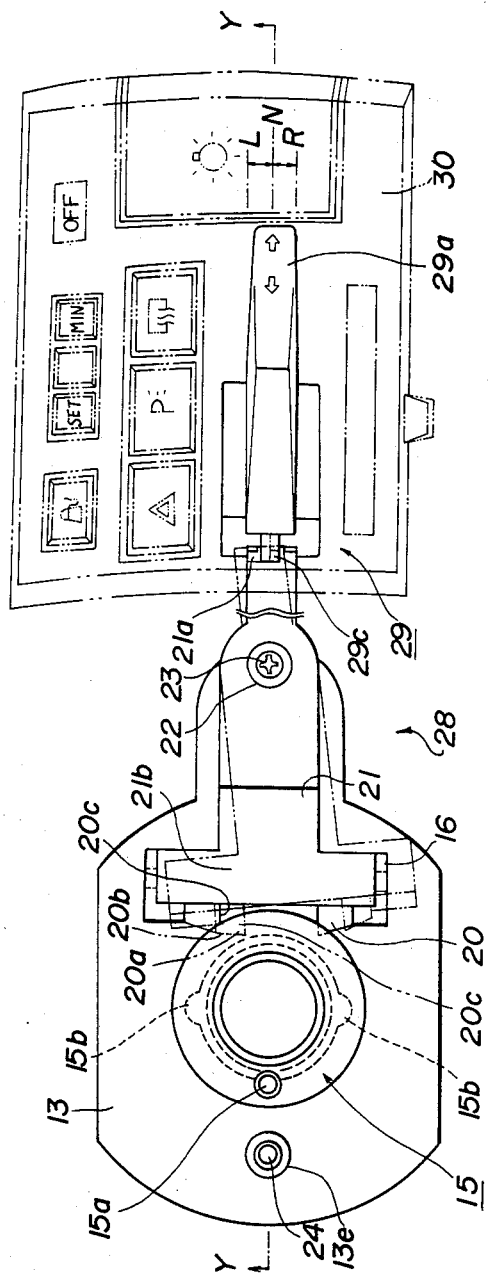
FIG. 4 is a plan view showing one embodiment of the turn signal for an automobile of the present invention.
Figure 5:
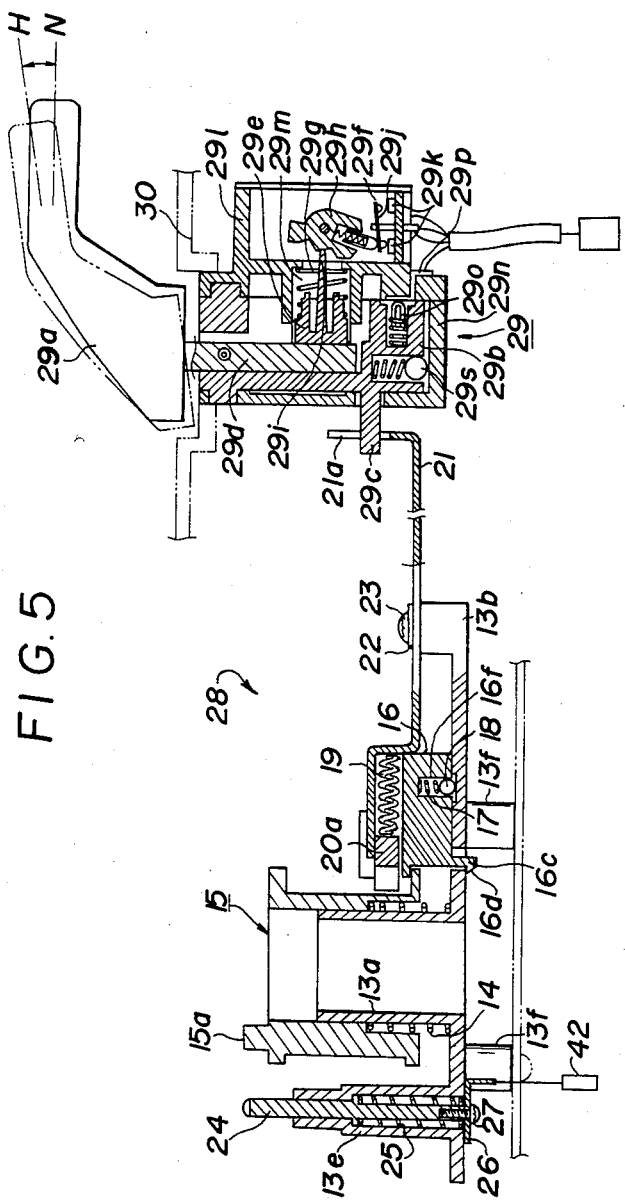
FIG. 5 is a sectional view of the major part taken on line Y—Y in FIG. 4.
Figure 6:
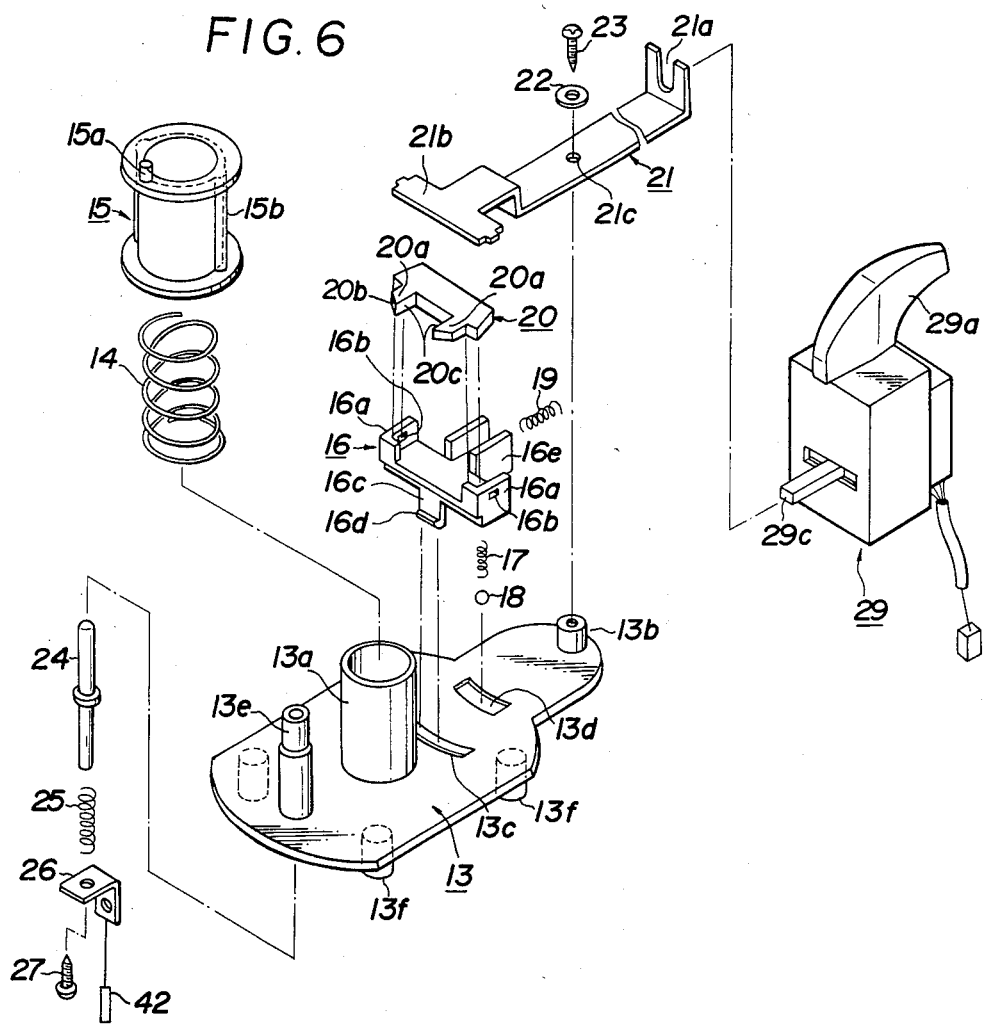
FIG. 6 is an exploded perspective view of the component parts of the one embodiment of a turn signal for automobile of the present invention.

Referring now to FIG. 4, FIG. 5 and FIG. 6, a detailed description of the preferred embodiment of a turn signal for an automobile of the present invention is given hereunder.

Reference numeral 13 denotes a supporting member. The supporting member 13 is secured to the periphery of a steering shaft (not shown) at the lower portion of a steering wheel (not shown) and works as a base for attaching various parts to comprise a self-cancel mechanism 28. At the central portion of the supporting member 13, a cylindrical column 13a with a specified height is formed through which the steering shaft is inserted in a freely rotatable condition and further a cancel rotor 15 is spring-fitted. Also at the center of one end portion of the upper surface of the supporting member 13, a supporting shaft 13b is formed which bears a control lever 21 in a freely swingable state in a horizontal direction. On the line linking the centers of the cylindrical column 13a and the supporting shaft 13b, a circular arc-shaped opening 13c is made to receive a moving member 16 which holds a cancel cam 20 and swings together with the control lever 21. Furthermore, a hollow 13d is formed in the supporting member 13 to provide a clicking touch for a lane change which allows the central lever 21 to sense the positioning in relation to the moving member 16 when it is swung to the left or to the right from the center position to reach a nearly intermediate position of a predetermined travelling stroke, i.e., when the electric circuit is formed by operating a control knob 29a of the turn signal switch 29.

In addition, in the vicinity of the upper surface end portion at the opposite side of the supporting member 13, a cylindrical column 13e is formed which is used to spring-insert a horn contact 24 by fitting slidingly to the lower face of the steering wheel, for example, to constitute the electric circuit of a horn.

What is more, at a predetermined position at the lower side of the supporting member 13, there are columns 13f to secure the supporting member 13 to a specified position on the steering column. A spring 14 works to energize a cancel rotor 15 inserted in the cylindrical column 13a of the foregoing supporting member 13 to allow the rotor to move freely in the axial direction of the steering shaft in a predetermined range.

The cancel rotor 15 is virtually cylindrical and spring-fitted onto the outer circumference of the cylindrical column 13a of the supporting member 13 in a freely rotatable state through the spring 14. At the end of the upper face of the cancel rotor 15, a boss 15a is provided to enable the rotor to be rotated together with the steering wheel by engaging the boss with the lower face of the wheel. On the cylindrical outer periphery of the cancel rotor 15, a protuberance 15b is fitted at an axially specified position.

The moving member 16 is fitted with the cancel cam 20 and at the same time held by the control lever 21 to move on the upper surface of the base 13 together as the control lever 21 is actuated. At the right and left ends, a wall 16a is installed erectly to keep the cancel cam 20 at a predetermined position and in order to fit the cancel cam 20 to the control lever 21 after housing the cam within the wall 16a. For example, a square hole 16b is provided at both upwardly-extending sides of the wall 16a. Also at the lower side of the moving member 16 at the front end adjacent to the cylindrical column 13a of the supporting member 13, a projection 16c is formed. Furthermore, at the tip of the projection 16c, a hooked portion 16d is formed integral with the projection 16c. The portion 16d is fitted loosely into the circular arc-shaped opening 13c of the supporting member 13 to work as a slip-out preventive. And further, at the backside end faces, opposing to each other, an upwardly-extending guide wall 16e is installed in parallel at both sides to enable the attachment of a spring 19 to push the back of the cancel cam with a specified pressure. A spring 17 and a steel ball 18 are fitted into a hole 16f made in the bottom of the moving member 16 and work to provide a clicking touch for positioning when the moving member 16 transfers to a predetermined position corresponding to the hollow 13d of the supporting member 13.

The spring 19 is fitted into the guide wall 16e of the moving member 16 to push the cancel cam 20 toward the steering shaft from the back of the cancel cam 20.

The cancel cam 20 has a given thickness and at the front ends of an almost rectangular flat plate, a pawl 20a is formed by symmetrically-extending projections spaced at a predetermined distance. The pawl 20a is attached to the moving member 16 to face the cancel rotor 15 to be spring-inserted to the cylindrical column 13a of the supporting member 13. The central end at the back is pressed by the spring 19. The control lever 21 is, for example, made by bending a flat plate like a batten plate and at the one end, a cut groove 21a is formed which engages with the turn signal switch 29 and at the other end, for example, a generally T-shaped holder part 21b is formed as shown in FIG. 6 to fix the moving member 16 by holding the upper face of the cancel cam 20 fitted to the moving member 16. A mounting hole 21c acting as a fulcrum is made at a nearly intermediate portion between both ends to swing the moving member 16 in a predetermined direction through the control lever 21 following the operation of the control knob 29a of the turn signal switch 29, and the control lever 21 is fitted onto the supporting shaft 13b of the supporting member 13 in a freely swingable status. A plain washer 22 and a tightening element 23, for example, are adapted to fit the abovementioned control lever 21 to the supporting member 13. A horn contact 24 and a spring 25 are inserted together into the cylindrical column 13e of the supporting member 13 to be slide-fitted to the lower face of the steering wheel to constitute the electric circuit of the horn 42. A terminal 26 and a tightening element 27 are also provided to complete the construction of the self-cancel mechanism 28. The turn signal switch 29 is put on the steering column at the outer circumference of the steering wheel which is relatively separate from the said self-cancel mechanism 28, for example, as shown by a fictitious outline in FIG. 4, on a mounting base 30 in combination with other various switches. In other words, the switch 29 can be attached as a component part of the combination switch unit. The turn signal switch 29 has a control knob 29a and by the transfer of a moving board 29b of the turn signal switch 29 which is swung together with the swing operation of the control knob 29a to the left L or to the right R from the neutral position N as shown in FIG. 4, the electric circuit of the turn signal lamp is constituted. At the same time, a drive shaft 29c of the moving board 29b protruding from the front side wall is engaged with the cut groove 21a of the control lever 21 to swing the control lever 21 of the self-cancel mechanism 28 in a horizontal direction. Also, a switch mechanism is included which provides the alternate changeover of the main light and dimmer light of a head lamp (not shown) and passing operation by moving the control knob 29a from a position N to a position H upward as shown in FIG. 5.

Next, a description is given on the construction of the turn signal switch 29.

A control bar 29d is secured to the lower end of the control knob 29a. The control bar 29d sways back and forth as the control knob 29a is operated vertically from the position N to the position H and accordingly, a moving element 29e accommodated in a case 29m of a base 29*l* fixed to the back of the turn signal switch 29 is pressed or released. A spring 29*g* is wound around this moving element 29*e*. At the center of the moving element 29*e*, an elastic projection 29*i* is provided and the moving element moves a rotary cam 29*h* as the control lever 29*d* is pressed. By the action of the rotary cam 29*h*, a push pin 29*f* is moved and a moving contact 29*j* seesaws to contact alternatively either of a pair of fixed contacts 29*k*. Thus, the lighting condition of the head lamp is changed alternately from the main light to the dimmer light and vice versa and a passing operation is also acccomplished. The abovementioned rotary cam 29*h*, push pin 29*f*, moving contact 29*j* and fixed contacts 29*k* are all fitted on the back of the base 29*l*. Further, the control bar 29*d* turns to the left or to the right as the control knob 29*a* is turned to the left or to the right. Also, the moving board 29*b* moves slidingly and a ball 29*s* contacting the inner face of an outer case 29*n* also makes a sliding action. Further, a moving contact 29*o* slides to contact with a left or right fixed contact 29*p*. Thus, a left-side turn signal lamp 36 or a right side turn signal lamp 37 can be flashed.

Hereunder a description is given on the action of the present invention.

In FIG. 4, when the control knob 29*a* of the turn signal switch 29 is operated, for example, from the neutral position N shown in the drawing to the right position R to signal a change in the running direction of an automobile, the moving board 29*b* engaged with the turn signal switch 29 sways together to constitute the electric circuit actuating the turn signal lamps and at the same time, the drive shaft 29*c* of the moving board 29*b* protruding from the front side wall is transferred in the opposite direction. Consequently, the control lever 21 of the self-cancel mechanism 28 engaging with the drive shaft 29*c* moves horizontally pivoting about the mounting hole 21*c* fitted onto the supporting shaft 13*b* of the supporting member 13. The cancel cam 20 is moved together with the moving member 16 in the same direction as the operating direction of the control knob 29*a* as shown by the fictitious outline in FIG. 4 and results in the status that one of the pawls 20*a* of the cancel cam 20 is put in the rotary track of the protuberant element 15*b* fitted to the cancel rotor 15.

When the steering wheel is operated to the right in the above condition, the protuberant element 15*b* of the cancel rotor 15 comes against a slanted face 20*b* at the tip of the pawl 20*a* of the cancel cam 20 to work to turn the moving member 16 to the right through the cancel cam 20. Then, since the moving member 16 retaining the cancel cam 20 is left stopped at a predetermined position by a stopper (not shown) or the like, the cancel cam 20 itself is pushed in toward the back against the pressure of the spring 19, allowing the protuberant element 15*b* to pass through easily. When the directional change of the automobile to the right is finished and then the steering wheel is operated in the opposite direction, to the left, to change the automobile running direction, the protuberant element 15*b* of the cancel rotor 15 comes against an inside face 20*c* of the pawl 20*a* of the cancel cam 20 which is left put in the rotary track and is pressed. Therefore, the moving member 16 and the control lever 21 are moved to return automatically to their original neutral positions N. Thus, the control lever 29*a* is also returned automatically to the neutral position N together through the drive shaft 29*c* of the turn signal switch 29 which is kept engaged with the cut groove 21*a* at the one end of the control lever 21.

When the control knob 29*a* of the turn signal switch 29 is operated to the left position L, an action occurs as in the above operation of turning the control knob to the right position R, but in opposite directions.

As described hereinabove, the self-cancel mechanism 28 and the turn signal switch 29 are joined to each other by a very simple means through the control lever 21 supported by pivoting at an almost intermediate point to enable the mechanism and the switch to be moved at both ends toward the sides opposite to each other. Thereby, a given switch function actuating a given turn signal lamp as well as a required self-cancel function are composed. The embodiment of the present invention has the above-described construction and actions and secures the following specific effects, namely:

(a) since the self-cancel mechanism and the turn signal switch are composed separate from each other, the turn signal switch can be installed by selecting a relatively free, desired position and at the same time, the operating method and form of the switch can be designed more freely, making it possible to provide a simple and compact turn signal device for automobile, and (b) the construction dividing the self-cancel mechanism from the turn signal makes application relatively easy, for example, only by changing the control lever length and the fulcrum position for a vehicle, and further makes the installation of a click joint for a lane change easier, providing turn signals for automobiles with a high general availability.

What is claimed is:

1. A turn signal switching device in an automobile comprising: a supporting member fitted onto the periphery of a steering shaft; a cancel rotor spring-inserted to said supporting member and supported in a freely rotatable status and rotated together with the rotating operation of a steering wheel of said automobile; a cancel cam retained at a predetermined position of the supporting member in a freely swingable state horizontally and placed to engage with said cancel rotor at a given position; a control lever retaining said cancel cam at one end, fitting an intermediate portion onto said supporting member in a freely swingable state to drive the cam to said predetermined position as desired, and forming a cut groove engaging with a drive shaft of a turn signal switch at another end; and a turn signal switch mountable freely on a desired position to transfer said cancel cam to a desired given position by driving the said control lever engaged with the cut groove.

2. A turn signal switching device in an automobile according to claim 1 wherein said one end of said control lever forms a T-shaped holding portion and the other end forms an L-shaped erect portion; and said T-shaped holding portion is secured to a moving member incorporated in a cancel mechanism, while said L-shaped erect portion is fitted fixedly to a moving board contained in said turn signal switch.

3. A turn signal switching device in an automobile as in either claim 1 or claim 2 wherein a head lamp control switch is provided by combining the turn signal switch with a control knob, a control lever joined to said control knob, a moving element pressed or released according to the vertical action of said control knob, a rotary cam rotating as the moving element moves, a moving contact piece making a seesaw switch action as the rotary cam works, and a fixed contact; and provided further with a turn signal lamp control switch combining a moving board, which slides to the right and to the left as the control knob is turned to the right and to the left, a moving contact making a switch-action to flash a left-side turn signal or a right-side turn signal lamp.

* * * * *